US012756148B2

(12) United States Patent
Frast

(10) Patent No.: US 12,756,148 B2
(45) Date of Patent: Oct. 6, 2026

(54) CONNECTING DEVICE

(71) Applicant: VAT Holding AG, Haag (CH)

(72) Inventor: Karl-Heinz Frast, Hohenems (AT)

(73) Assignee: VAT Holding AG, Haag (CH)

( * ) Notice: Subject to any disclaimer, the term of this patent is extended or adjusted under 35 U.S.C. 154(b) by 776 days.

(21) Appl. No.: 17/993,113

(22) Filed: Nov. 23, 2022

(65) Prior Publication Data

US 2023/0163545 A1 May 25, 2023

(30) Foreign Application Priority Data

Nov. 25, 2021 (DE) ......................... 102021130901.8

(51) Int. Cl.
*H01R 41/00* (2006.01)
*F16L 27/11* (2006.01)
*H01R 31/06* (2006.01)
*H05H 13/04* (2006.01)

(52) U.S. Cl.
CPC .............. *H01R 41/00* (2013.01); *F16L 27/11* (2013.01); *H01R 31/06* (2013.01); *H05H 13/04* (2013.01)

(58) Field of Classification Search
CPC ......... H01R 41/00; H01R 31/06; F16L 27/11; F16L 27/1012; F16L 27/1021; F16L 27/111; F16L 27/125; F16L 27/026
USPC .......................................................... 285/226
See application file for complete search history.

(56) References Cited

U.S. PATENT DOCUMENTS

| | | | | |
|---|---|---|---|---|
| 3,044,805 A * | 7/1962 | Mcdonald | F16L 51/027 | 285/226 |
| 3,427,051 A * | 2/1969 | White | F16L 27/026 | 285/302 |
| 3,957,290 A * | 5/1976 | Whitby | F16L 39/00 | 285/226 |

(Continued)

FOREIGN PATENT DOCUMENTS

| | | |
|---|---|---|
| DE | 102012024185 | 6/2014 |
| DE | 102019132862 | 6/2021 |

(Continued)

OTHER PUBLICATIONS

Suetsugu Y. et al: "Design studies on a vacuum bellows assembly with radio frequency shield for the Kek B factory", Review of Scientific Instruments, vol. 67, No. 8, Aug. 1, 1996 (Aug. 1, 1996).

*Primary Examiner* — David Bochna
(74) *Attorney, Agent, or Firm* — Volpe Koenig

(57) ABSTRACT

A connecting device (1) for a line system for passing through charged particles, the connecting device (1) having first and second flanges (2, 4) and a bellows (6). The first flange (2) and the second flange (4) are connected to each other with the interposition of the bellows (6), and the first flange (2) and the second flange (4) are movable relative to one another to compensate for displacements in the line system in a longitudinal direction (7) and in at least one transverse direction (8) angled relative thereto. A line element (10) is arranged inside the bellows (6) and connects the flanges (2, 4) electrically conductively to one another. The line element (10) is movably mounted in or on both connection elements (13, 14) of the two flanges (2, 4), and/or the line element (10) has at least one annular spring (15) or at least one helical spring (16).

12 Claims, 12 Drawing Sheets

(56) References Cited

U.S. PATENT DOCUMENTS

| | | | | |
|---|---|---|---|---|
| 5,704,657 | A * | 1/1998 | Asanuma ................ | E02D 29/16 285/224 |
| 6,902,204 | B2 * | 6/2005 | Atanasoski ......... | F01N 13/1811 285/226 |
| 8,844,579 | B2 * | 9/2014 | Eguchi ................... | F16L 27/111 138/121 |
| 2003/0116964 | A1 * | 6/2003 | Springmann ......... | F16L 27/082 285/226 |
| 2015/0121715 | A1 * | 5/2015 | Houser ................... | D06F 58/20 34/235 |
| 2017/0279205 | A1 | 9/2017 | Goirand et al. | |

FOREIGN PATENT DOCUMENTS

| | | |
|---|---|---|
| JP | 11339999 | 12/1999 |
| KR | 20180119367 | 11/2018 |
| KR | 20210020594 | 2/2021 |
| WO | 2019012175 | 1/2019 |

* cited by examiner

CONNECTING DEVICE

INCORPORATION BY REFERENCE

The following documents are incorporated herein by reference as if fully set forth: German Patent Application No. 10 2021 130 901.8, filed Nov. 25, 2021.

TECHNICAL FIELD

The present invention relates to a connecting device used for synchrotrons or other particle accelerators for passing through charged particles.

BACKGROUND

Connecting devices of this type are used in so-called synchrotrons or other particle accelerators. These synchrotrons or particle accelerators have a line system consisting of lines and/or chambers through which electrically charged particles are passed, usually in the form of electrically charged particle beams. In such line systems, connecting devices of the type in question serve to compensate for displacements and changes in length caused by thermal or other factors so that excessive stresses or distortion do not occur in the line system. For this purpose, such connecting devices are designed to be flexible so that the first flange and the second flange can move relative to each other in the longitudinal direction of the connecting device and also in at least one transverse direction angled relative to the longitudinal direction, in order to compensate for the displacements and/or changes in length in the line system caused, for example, by thermal factors.

In addition, it is also important that the electrically charged particles or the beam of electrically charged particles that also pass through the connecting device or through the line cavity of the line element are not deflected or negatively influenced in any other way.

A connecting device of the type in question is shown in FIG. 1 of US 2017/0279205 A1. The connecting devices shown in FIGS. 2 to 4 of US 2017/0279205 A1 are not devices of the type in question. Their flanges are not connected to each other with the interposition of a bellows.

SUMMARY

It is the object of the invention to improve connecting devices of the type in question in such a way that they can compensate well for displacements in the longitudinal and transverse directions of the connecting device and at the same time the charged particles passed through the line cavity are deflected as little as possible or are not deflected or otherwise negatively influenced during this relative displacement of the flanges with respect to each other.

This is achieved by a connecting device having one or more of the features disclosed herein.

In the invention, it is thus provided that a connection element is arranged on the first flange and on the second flange in each case for electrically connecting the line element to the flange in question, the line element being movably mounted in or on both connection elements, and/or the line element having or consisting of at least one annular spring or at least one helical spring.

The line element according to the invention ensures that the cross-sectional area of the line cavity arranged inside the line element remains as constant as possible in the event of a relative displacement of the flanges of the connecting device relative to one another caused by thermal or any other factors. This, in combination with the bellows guided around the outside of the line element, ensures that the charged particles passed through the line cavity of the connecting device are not deflected or otherwise negatively influenced, or at least only minimally. The invention ensures that the flanges remain optimally electrically conductively connected to each other via their connection elements and the line element even in the event of larger displacements of the flanges in the longitudinal direction of the connecting device and/or in the transverse direction thereof. This is achieved by the movable mounting of the line element in or on both connection elements and/or simply by the fact that the line element is formed as an annular spring or helical spring or at least has such a spring.

In case of doubt, the terms "longitudinal direction" and "transverse direction" of the connecting device refer to the initial position of the connecting device in which the two flanges of the connecting device are not displaced relative to each other by external forces. The transverse direction(s) is/are angled to the longitudinal direction. Preferably, the transverse direction(s) run orthogonal to the longitudinal direction.

Connecting devices according to the invention are preferably used in line systems of synchrotrons or other particle accelerators. These line systems can, as is known per se, comprise lines but also chambers.

In connecting devices according to the invention, the first flange and the second flange are connected to each other with the interposition of the bellows. There are different variants for this. The bellows can extend over the entire distance between the first flange and the second flange and thus directly connect the first flange and the second flange to each other. However, it is also possible that the bellows only extends over a partial region between the first flange and the second flange. In these exemplary embodiments, a jacket tube is advantageously arranged at least on at least one of the flanges. The bellows can then extend, for example, from a free end of the jacket tube to the other flange. A second jacket tube can be arranged around the bellows and is then preferably arranged or fixed or formed on the other flange. In any case, the bellows is advantageously made of metal.

Since the connecting device according to the invention serves to compensate for length changes and/or displacements in a line system, in particular those caused by thermal factors, it could also be referred to as a compensation device or a compensation connecting device.

In order to be able to compensate not only for displacements of the line system in the longitudinal and/or transverse direction of the connecting device, but also for torsional movements in the line system, particularly preferred variants of the invention provide that at least one of the connection elements is rotatably mounted on the flange on which it is arranged, preferably rotatably about an axis of rotation coaxial or at least parallel to the longitudinal direction of the connecting device.

The line element that surrounds the line cavity can be formed to be circumferentially closed. However, this is not absolutely necessary. Rather, it is important that the line element connects the connection elements and thus the two flanges of the connecting device to each other so as to produce a good electrically conductive connection. For this purpose, it can also be provided that the line element comprises a plurality of rods, the rods being arranged running parallel to each other and spaced apart from each other and jointly surrounding a partial region of the line cavity or the entire line cavity. The line element can also consist exclusively of such an arrangement of rods.

In order to be able to compensate for displacements of the flanges in the longitudinal and/or transverse direction of the connecting device and at the same time ensure optimum electrical contact, it is preferably provided that the rods are mounted movably and electrically conductively in or on both connection elements. In this context, it is particularly preferred that the rods are mounted movably and electrically conductively in rod-receiving cavities of the two connection elements. In the latter variants, the rods are preferably movably mounted with their ends in the rod-receiving cavities. There, they are surrounded on all sides by the corresponding walls of the connection element, so that the rods cannot lift off from the connection element, but rather a very good electrical contact is always ensured between each rod and the corresponding connection element. Preferably, the rods each have a circular cross-section. This is also very favourable in terms of ensuring optimum electrical contact. Alternative variants, however, also provide for the rods to be formed as flattened rods.

It can also be provided that two bulges, spaced apart from one another in the longitudinal direction of the connecting device, are formed on rods of the connection element in question for electrically conductive connection to one rod each of the line element, the rods with the bulges resting in an electrically conductive manner on the particular rod of the line element and the particular rod of the line element being supported by a support shoulder of the connecting device in a region between the two bulges on the side opposite the particular rod of the particular connection element. The at least two bulges arranged one behind the other in the longitudinal direction of the connecting device and the support shoulder arranged between them in the longitudinal direction ensure particularly good electrical contact between the rods of the line element and the corresponding connection element even if there are larger displacements in the longitudinal and/or transverse directions of the connecting device.

Another variant for achieving precisely this provides that the ends of the rods of the line element facing the connection element in question each have a bend and the connection element in question has rods with bends, the bends of the rods of the connection element in question being arranged in intermediate spaces between the bends of the rods of the line element and a connecting rod being passed through the bends of the rods of the particular connection element and through the bends of the rods of the line element. It is advantageous here if the various bends of the rods are in the form of slots extending in the longitudinal direction of the connecting device. This ensures that the connecting rod is mounted in the bends so that it is displaceable in the longitudinal direction.

In the variants in which the line element has an annular spring or is formed as such, it is advantageously provided that the annular spring has a sequence of ring elements arranged one behind the other, the successive ring elements being connected to one another by means of elastic elements and being movable relative to one another. The ring elements can preferably be rigid bodies in themselves. Advantageously, all ring elements have the same diameter. However, this does not necessarily have to be so. In any case, the elastic elements mounted between the ring elements ensure a corresponding movability of the annular spring in order to be able to compensate for an offset between the flanges in the longitudinal and/or transverse direction of the connecting device. Here, too, the ring elements ensure that the line element has the same line cross-section everywhere, even in a relatively strongly deflected state. In addition to the elastic elements, which can be formed as a helical spring, for example, electrical sliding contacts can also be arranged between the ring elements and ensure an optimal electrically conductive connection of the successive ring elements to each other and an optimal electrically conductive transition from the line element to the corresponding connection element.

In variants of the invention in which a helical spring is part of or forms a line element, it is advantageously provided that the helical spring has a plurality of turns arranged one behind the other, which are elastically movable relative to each other. This also ensures that the line cavity within the line element has the same cross-section everywhere, even in the case of larger relative displacements of the flanges in the longitudinal and/or transverse direction of the connection element. In the undeflected state of the connecting device, the turns are advantageously arranged on an imaginary circular-cylinder lateral surface. Particularly preferred variants provide that the line element has two helical springs or consists of these, one of the helical springs being arranged in an interior space of the other helical spring, it preferably being provided that the turns of the two helical springs are arranged offset with respect to one another in the longitudinal direction of the connecting device.

Connecting devices according to the invention are advantageously designed so that a negative pressure or vacuum in the region of $1\times10^{-10}$ mbar (millibar) and smaller can be formed in the interior space surrounded by the bellows.

Particularly preferred variants of the invention provide that the flanges, the connection elements and/or the line element consist of or comprise a copper-beryllium alloy. Alternative materials are stainless steel or copper, which are preferably silver-plated or gold-plated.

BRIEF DESCRIPTION OF THE DRAWINGS

Further features and details of the invention, as well as preferred variants thereof, are explained below by way of example in the description of the figures, in which.

DETAILED DESCRIPTION

Figure 1:
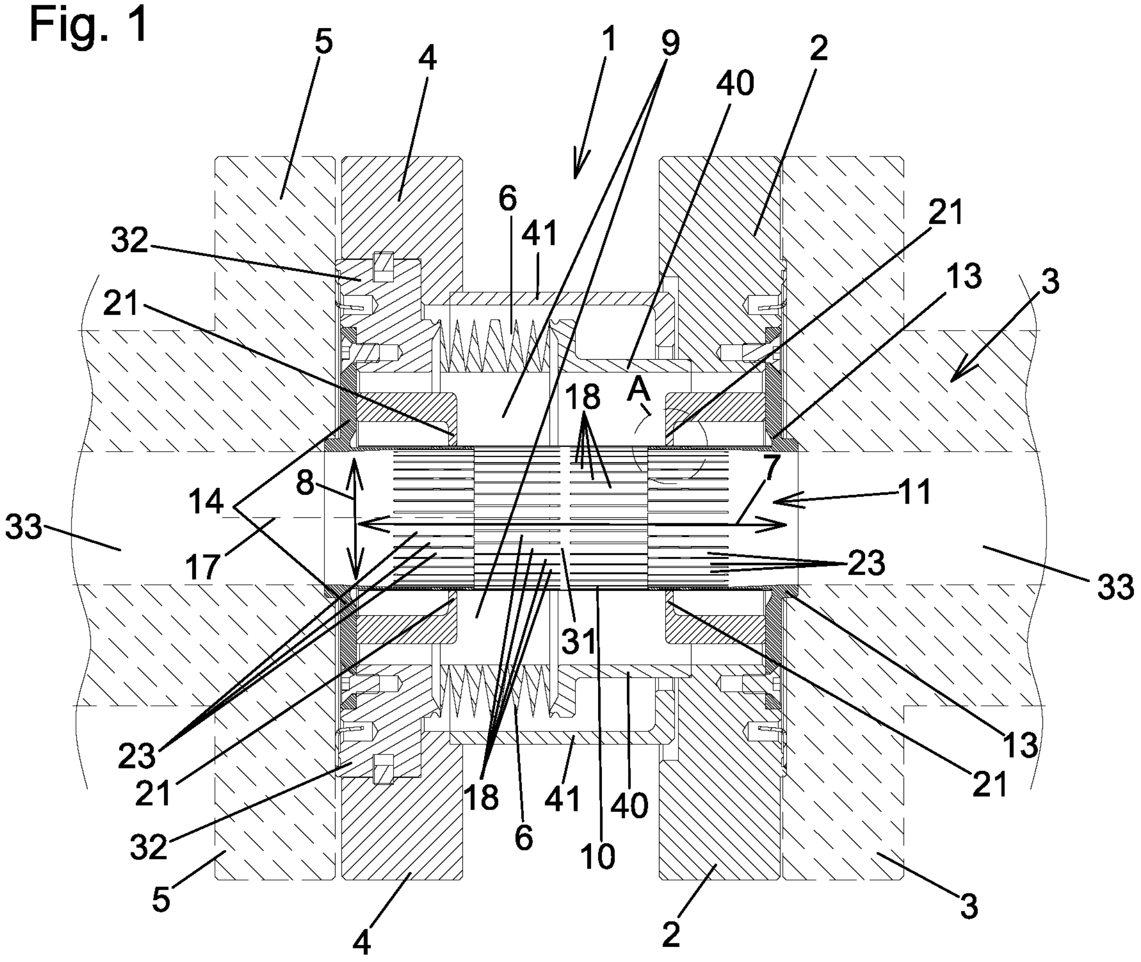
FIGS. 1 to 4 show illustrations of a first exemplary embodiment of a connecting device according to the invention.
Figure 2:
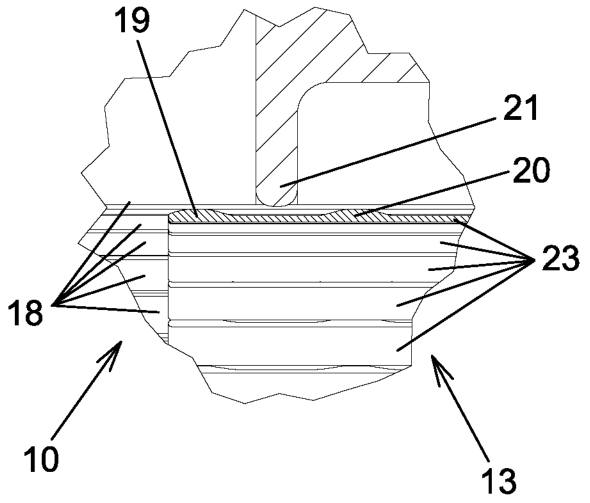
Figure 3:
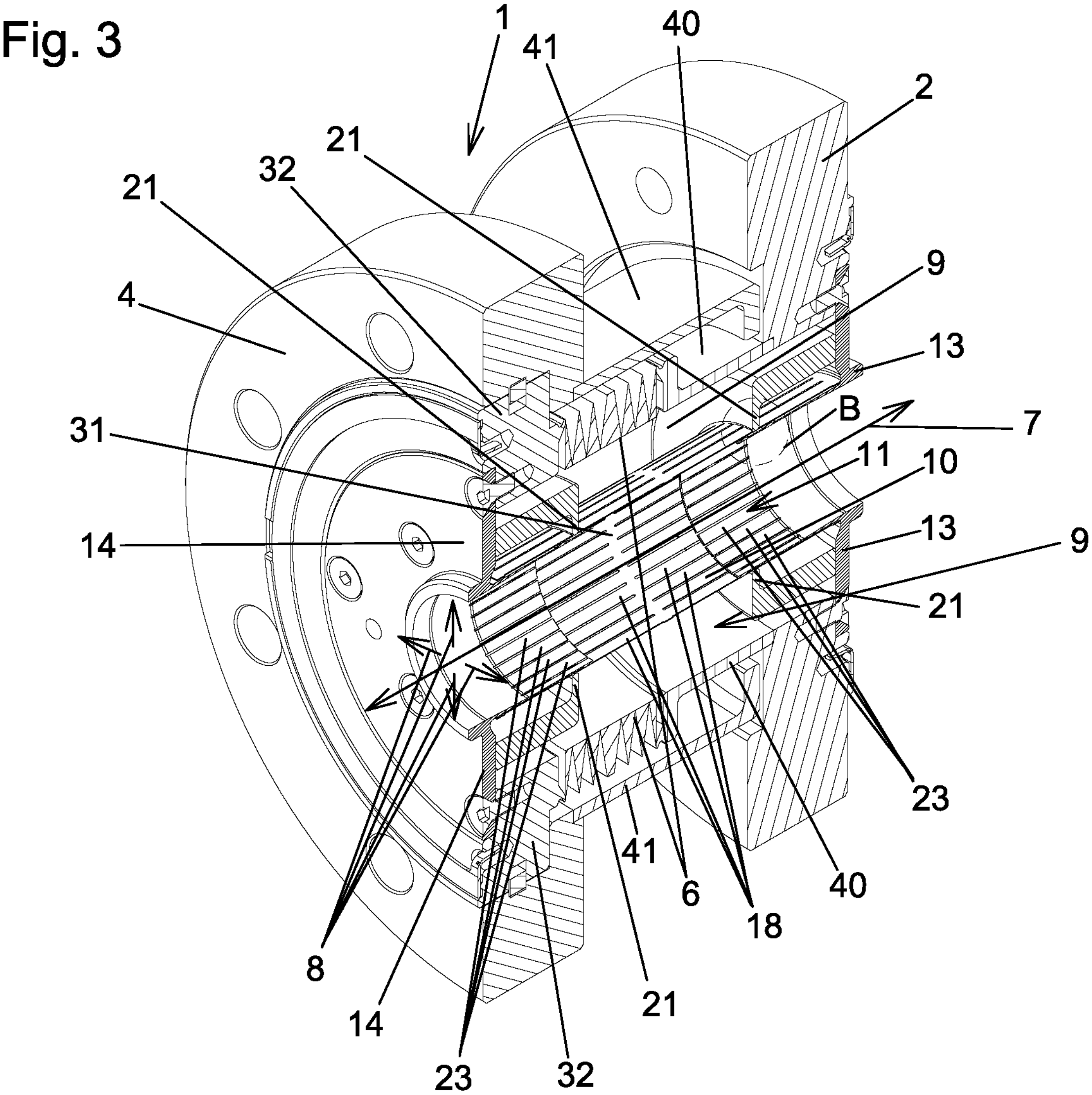
Figure 4:
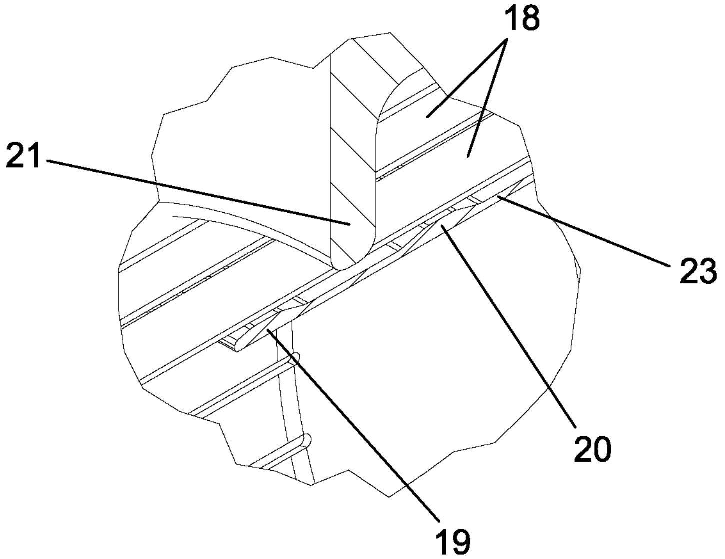
Figure 5:
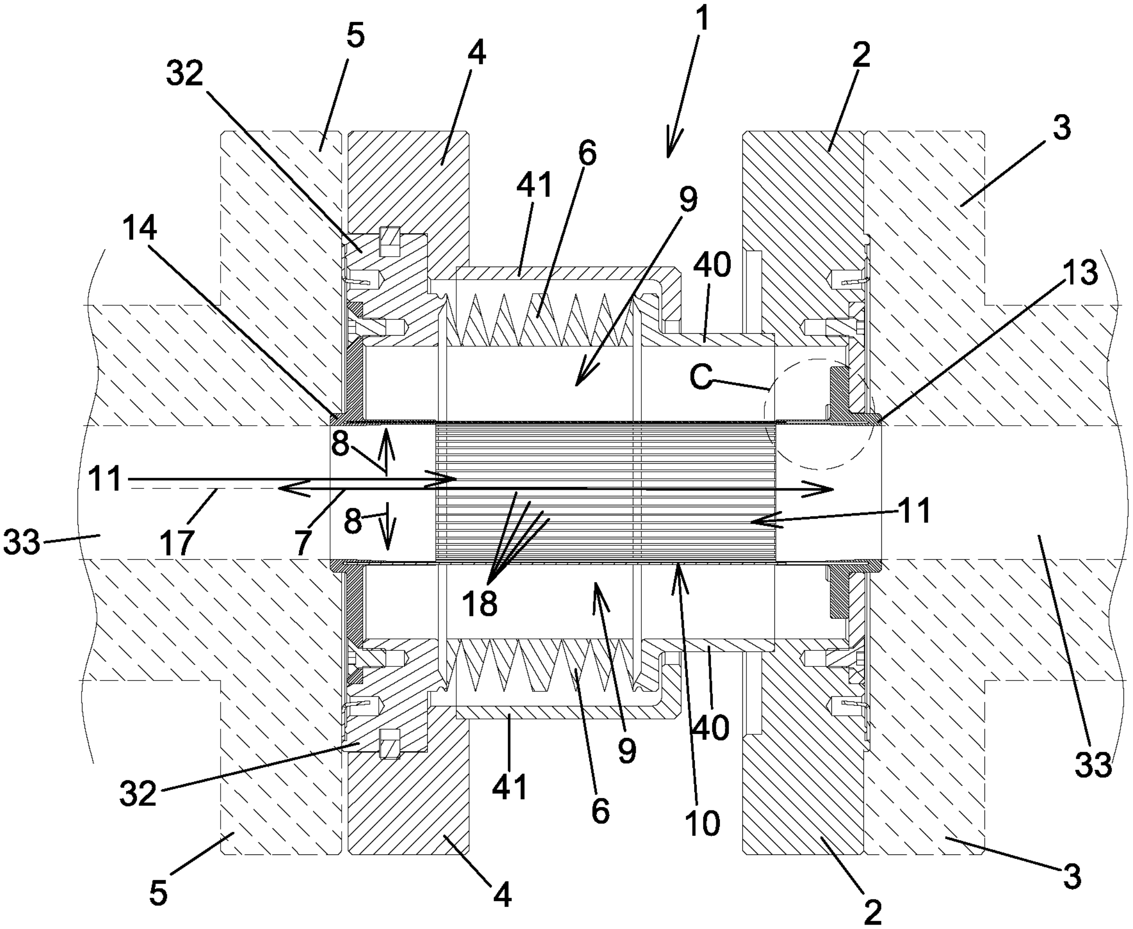
FIGS. 5 to 8 show illustrations of a second exemplary embodiment of a connecting device according to the invention.

The first exemplary embodiment according to the invention of a connecting device 1 shown in FIGS. 1 to 4 is explained below firstly. FIG. 1 shows a longitudinal section through the connecting device 1 according to the invention. FIG. 2 shows the region A from FIG. 1 enlarged. FIG. 3 shows a perspective view of the connecting device 1 and FIG. 4 shows the region B from FIG. 3 enlarged.

Before discussing the special embodiment of the line element 10 and its connection to the connection elements 13 and 14 in this exemplary embodiment, features of this embodiment as also realized in the subsequent exemplary embodiments are discussed. This part of the description thus applies to all embodiments shown here.

In all exemplary embodiments, this connecting device is a connecting device 1 for a line system of a synchrotron or another particle accelerator. Electrically charged particles, usually in the form of a beam of electrically charged particles, are thus passed through this line system as well as through the connecting device 1. The line system can comprise both lines and chambers. In any case, the connecting device 1 comprises a first flange 2 and a second flange 4 as well as a bellows 6. The first flange 2 and the second flange 4 are connected to each other with the interposition of the bellows 6. In this exemplary embodiment, this is realized in such a way that the bellows 6 extends only over a partial region of the connection between the two flanges 2 and 4. Specifically, in this exemplary embodiment, as in the other exemplary embodiments, it is arranged between the pivot bearing ring 32 of the second flange 4 and a jacket tube 40, which is fixed to the first flange 2. In alternative embodiments, however, the bellows 6 could, for example, also extend completely from the first flange 2 to the second flange 4. In FIG. 1, lines 3 and 5 of the line system are indicated by dashed lines. The first flange 2 is connected to the first line 3 and the second flange 4 to the second line 5. Instead of lines 3 or 5, chambers of the line system could of course also be connected to one of the flanges 2 and 4 or to both flanges 2 and 4 accordingly. In any case, the connecting device 1 is arranged between the lines 3 and 5 or chambers of the line system in such a way that the line interior 33 of the particular line or a corresponding chamber interior space is aligned with the line cavity 11 of the line element 10 and is in communication, so that electrically charged particles passed through the line interior 33 and in particular a corresponding beam of electrically charged particles is also passed correspondingly through the line cavity 11 of the line element 10.

The connecting device 1 of all exemplary embodiments shown here serves to compensate for displacements between the first line 3 or chamber of the line system and the second line 5 or chamber of the line system. These displacements can occur both in the longitudinal direction 7 of the connecting device 1 and in at least one transverse direction 8 of the connecting device 1, which is angled with respect to the longitudinal direction and is preferably orthogonal. The flanges 2 and 4 of the connecting device 1 can be moved along with their respective lines 3 and 5 or chamber to which they are attached. The bellows 6 and the corresponding line element 10 allow this relative movement of the flanges 2 and 4 both in the longitudinal direction 7 and in the transverse direction(s) 8, so that no stresses or breaks occur in the line system. These displacements in the longitudinal direction 7 and/or transverse direction 8 in the line system can be caused by thermal, but also other factors.

All line elements 10 realized in the exemplary embodiments shown here have the advantage that they can compensate for corresponding relative movements between the flanges 2 and 4 without the risk of their electrically conductive connection to the connection elements 13 and 14 and thus between the flanges 2 and 4 being interrupted. In addition, the line elements 10 have the advantage that they always ensure that the opening cross-section of the line cavity 11 surrounded by the line element 10 remains at least substantially unchanged during these relative displacements of the flanges 2 and 4 with respect to each other. This ensures that the particles passed through the line cavity 11 are not deflected and thus the particle beam remains undisturbed.

In all exemplary embodiments, it is in any case the case that the line element 10 is arranged in the interior space 9 surrounded at least in regions by the bellows 6, the line elements 10 of the various exemplary embodiments electrically conductively connecting the flanges 2 and 4 to one another via the connection elements 13 and 14. The interior space of the line element 10 forms the line cavity 11 through which the charged particles are passed.

In all exemplary embodiments shown here, a jacket tube 41 is arranged on the second flange 4. This surrounds the bellows 6 as well as the jacket tube arranged on the first flange 2. However, as already explained above, this can also be solved differently.

In order to be able to compensate not only for relative displacements in the line system in the longitudinal direction 7 and in the transverse direction 8, but also to be able to compensate for torsional movements in the line system, it is provided in all variants shown here that at least one of the connection elements 13 or 14 is rotatably mounted on the corresponding flange 2 or 4 on which it is arranged. Specifically, this is realized in the exemplary embodiments shown here by the pivot bearing ring 32, to which the connection element 14 is fixed. This pivot bearing ring 32 is rotatably mounted in the second flange 4. The axis of rotation 17 about which the pivot bearing ring 32 is rotatable runs coaxially or at least parallel to the longitudinal direction 7.

In all exemplary embodiments, it is in any case the case that connection elements 13 and 14 are arranged one on the first flange 2 and one on the second flange 4, for electrically connecting the line element 10 to the flanges 2 and 4.

In the first exemplary embodiment shown in FIGS. 1 to 4, when relative movement occurs between the flanges 2 and 4, electrical contact between the line element 10 and the two connection elements 13 to 14 is ensured by the line element 10 being movably mounted in or on both connection elements 13 and 14.

The line element 10 has a plurality of rods 18. The rods 18 run parallel to each other and are spaced apart from each other in the circumferential direction. Together, they surround at least a partial region of the line cavity 11. In this first exemplary embodiment, the rods 18 of the line element 10 are connected to each other in the central region of the line element in a connecting region 31.

In this first exemplary embodiment, rods 23 are also formed on the various connection elements 13 and 14. The rods 23 of the connection element 13 are pushed into the line element 10 on one side. The rods 23 of the other connection element 14 are pushed into the line element 10 on the opposite side. For the electrically conductive connection of one rod 23 of each of the connection elements 13 and 14 to one rod 18 of the line element 10, in this exemplary embodiment two bulges 19 and 20 are formed on the particular rod 23 of the particular connection element 13 and 14 and are spaced apart from one another in the longitudinal direction 7 of the connecting device 1. These bulges can be seen particularly well in the enlargement of the region A from FIG. 1 in FIG. 2. The rod 23 in question rests with its bulges 19 and 20 on the rod 18 in question of the line element 10 in an electrically conductive manner. In the region between the two bulges 19 and 20, the rods 18 of the line element 10 are each supported on the side opposite the rod 23 in question by a support shoulder 21 of the connecting device 1. In FIG. 2, as well as in the perspective view in FIG. 4, it can be clearly seen how the rods 18 of the line element 10 are guided through between the particular support shoulder 21 on one side and the rods 23 of the particular connection element 13 or 14 with the bulges 19 and 20 on the other side. If there is now a relative movement of the two flanges 2 and 4 in the longitudinal direction 7 and/or in the transverse directions 8, the interaction of the bulges 19 and 20 with the support shoulder 21 in question ensures that the line element 10 with its rods 18 always remains in optimum electrical contact with the connection elements 13 and 14 or their rods 23. This also ensures the electrically conductive connection between the flanges 2 and 4. The rods 18 of the line element 10 as well as the rods 23 of the connection elements 13 and 14 are correspondingly elastic in order to allow these movements of the flanges 2 and 4 relative to each other. The described type of connection between the line element 10 and the connection element 14 is the same as between the line element 10 and the connection element 13. This is again the case in all exemplary embodiments.

Figure 6:
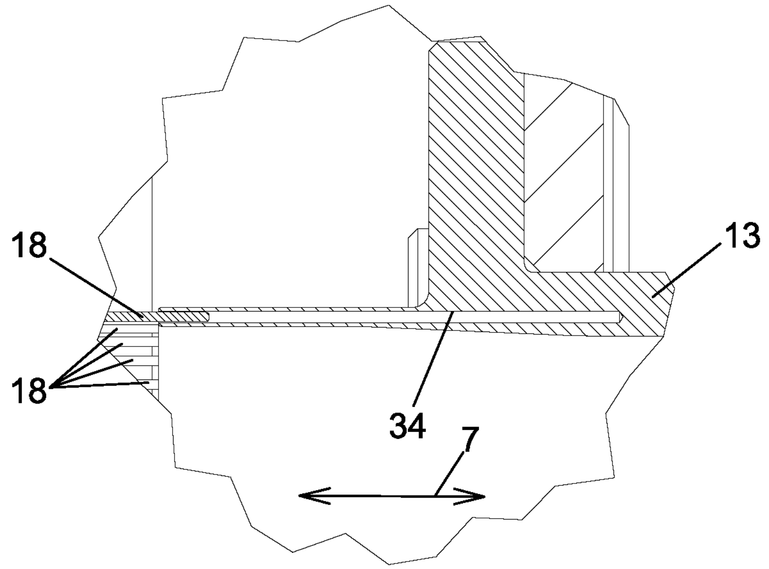
Figure 7:
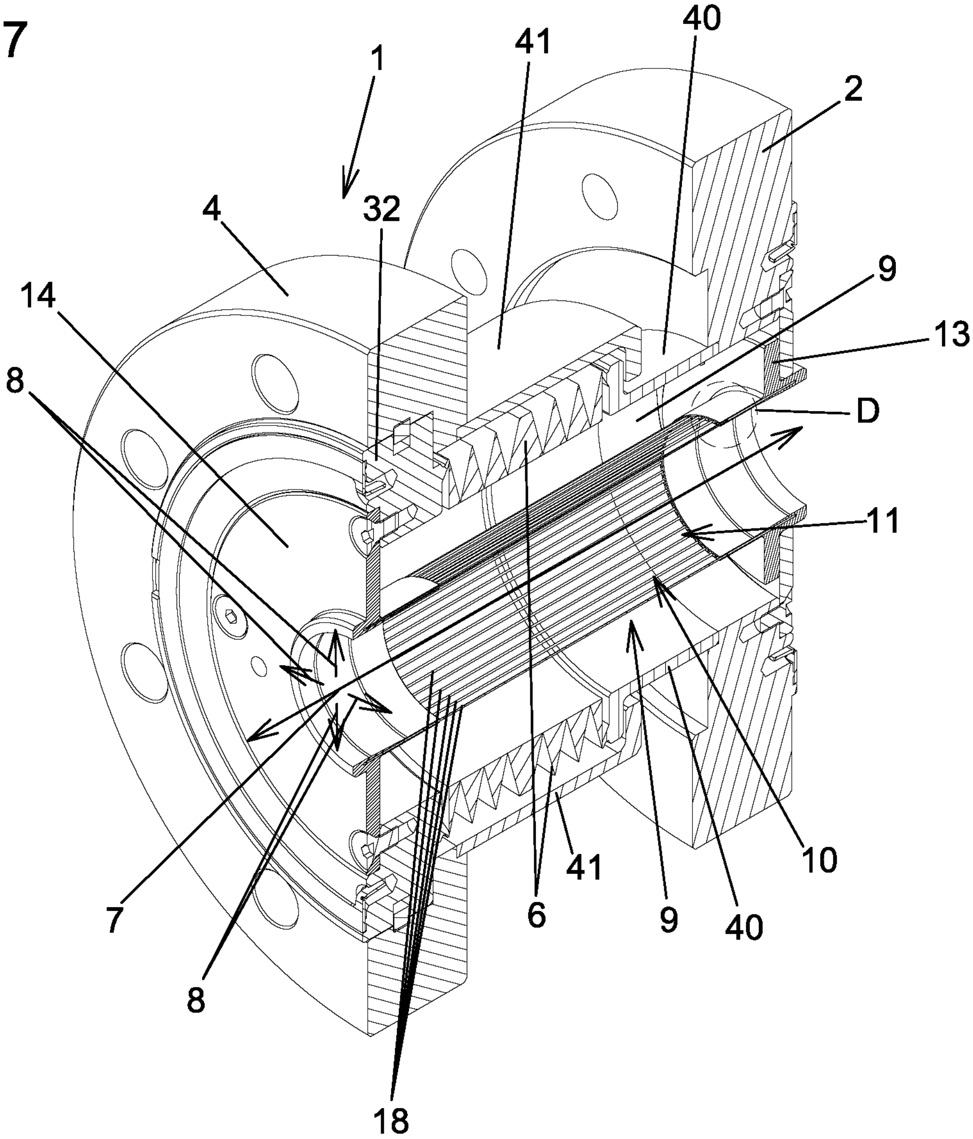
Figure 8:
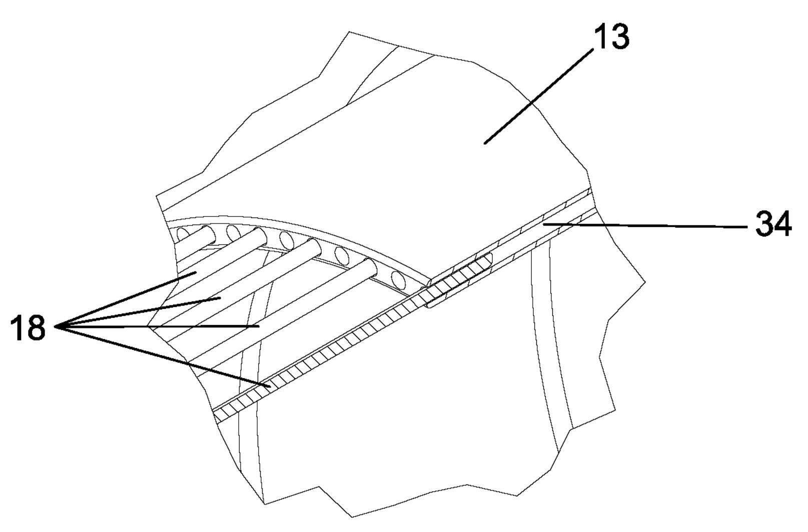

Looking now at the second exemplary embodiment of the invention in FIGS. 5 to 8, FIG. 5 in turn shows a corresponding longitudinal section. FIG. 6 shows the region C from FIG. 5 enlarged. FIG. 7 shows this second exemplary embodiment of the connecting device 1 from FIG. 5 in a perspective, longitudinal sectional view. FIG. 8 shows the region D from FIG. 7 enlarged. In the following, fundamentally only the differences from the first exemplary embodiment will be discussed. Otherwise, reference is made to the previous explanations.

A common feature with the first exemplary embodiment is first of all that here, too, the line element 10 has a plurality of rods 18 which run parallel to one another and are arranged at a distance from one another and together surround the line cavity 11 between the connection elements 13 and 14. In contrast to the first exemplary embodiment, however, the rods 18 of the line element 10 are not connected to one another in a connecting region 31. Rather, their arrangement results from their connection to the connection elements 13 and 14.

In this second exemplary embodiment of the invention according to FIGS. 5 to 8, the rods 18 each have a circular cross-section. This can be seen particularly well in FIG. 8. The rods 18 are each mounted movably and electrically conductively in both connection elements 13 and 14. Specifically, in this exemplary embodiment, it is provided that the rods 18 are each arranged with their respective end regions in rod-receiving cavities 34 of the two connection elements 13 and 14. This can be seen clearly in FIG. 6 and in FIG. 8. The rods 18 are mounted in the respective rod-receiving cavities 34 so as to be displaceable in the longitudinal direction. The walls of the connection element 13 and 14 surrounding the rod receiving cavities 34, however, always ensure a safe electrical contact between the rods 18 and thus the line element 10 and the particular connection element 13 or 14, even with a corresponding relative displacement of the two flanges 2 and 3 in the transverse direction 8, since the rods 18 are in contact with the particular connection element 13 or 14 over their entire circumference in the rod receiving cavity 34.

Figure 9:
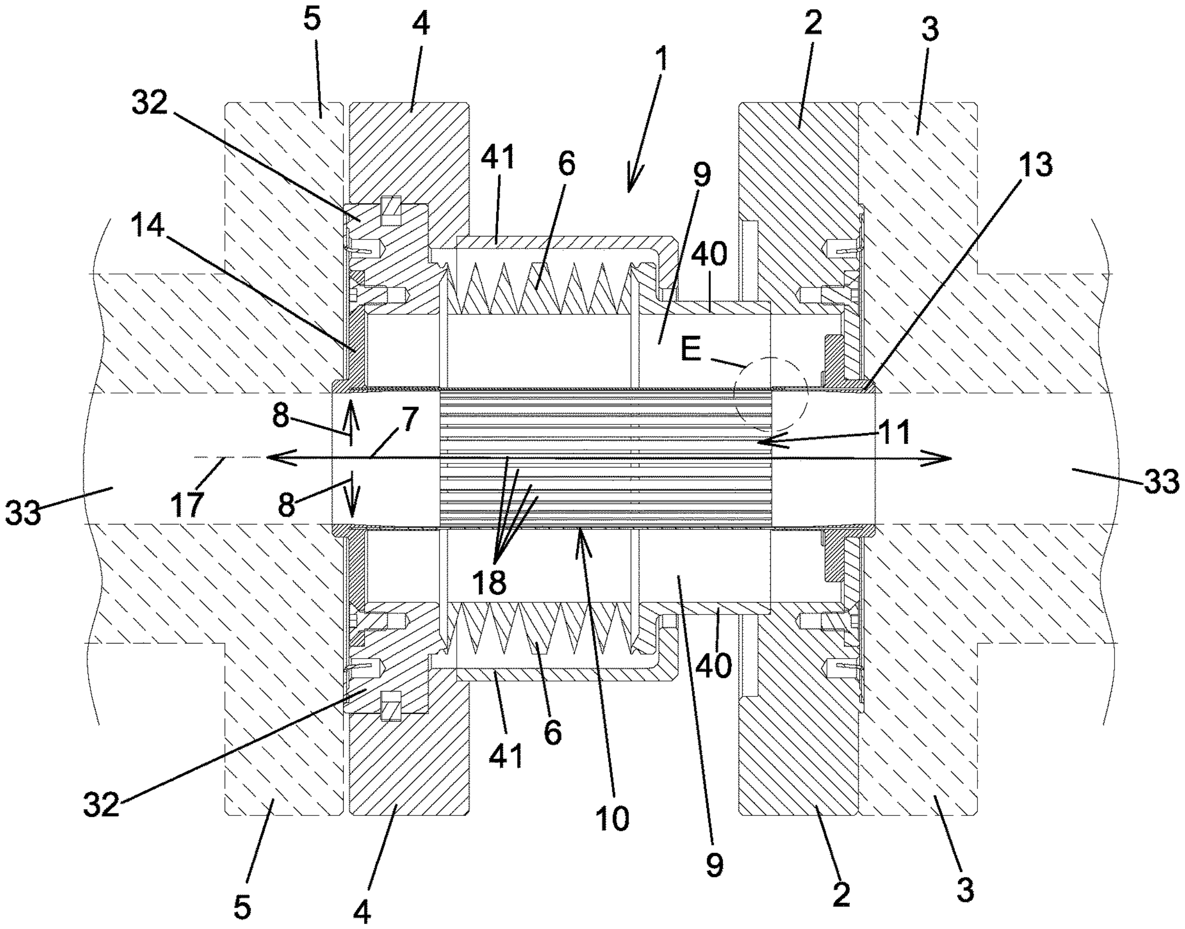
FIGS. 9 to 12 show illustrations of a third embodiment of a connecting device according to the invention.
Figure 10:
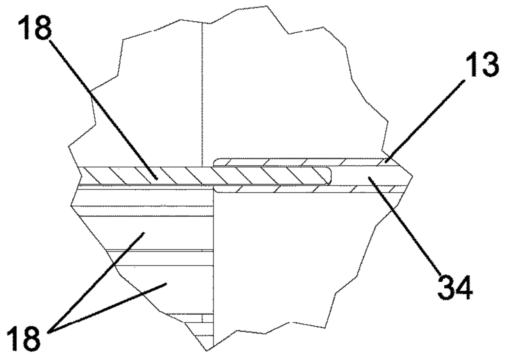
Figure 11:
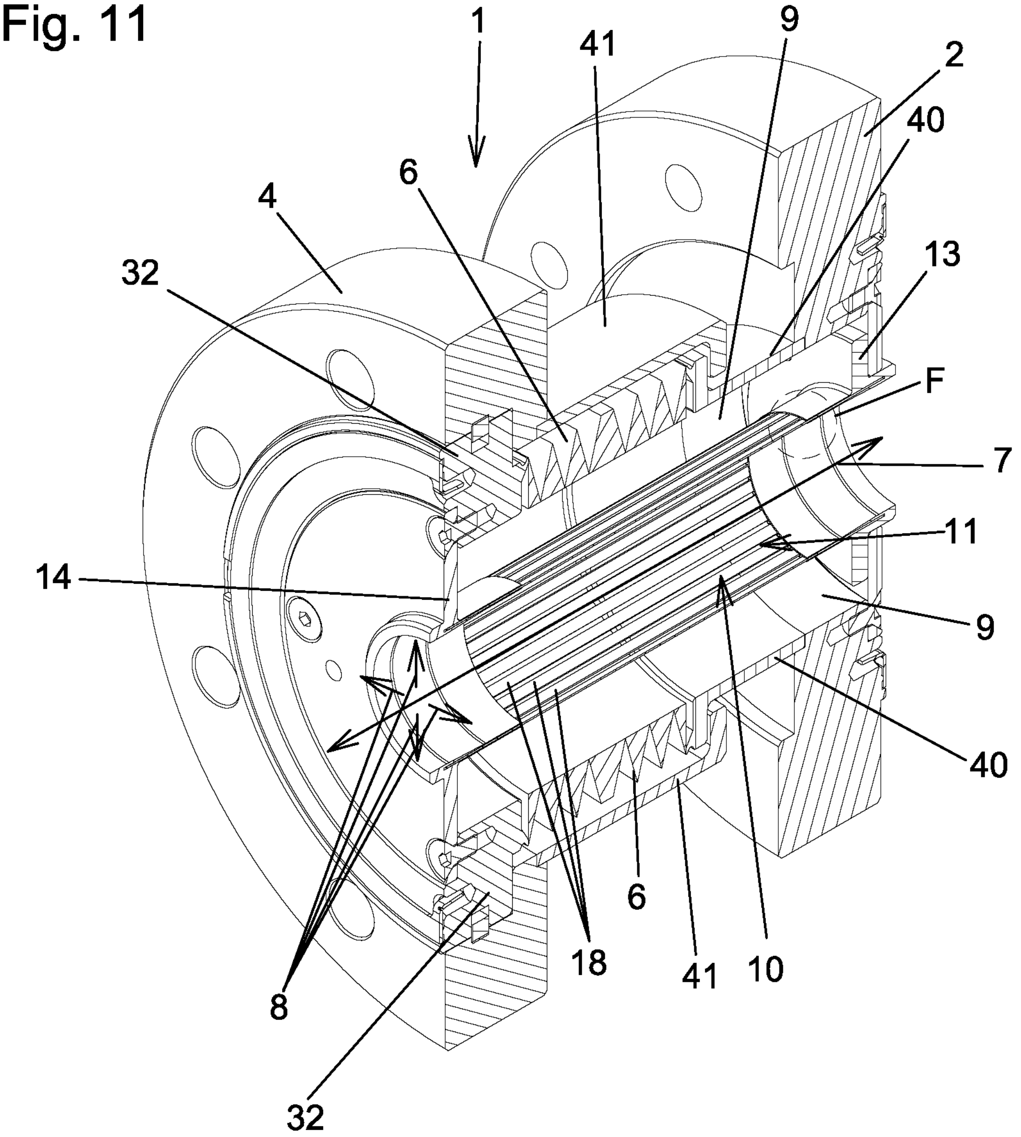
Figure 12:
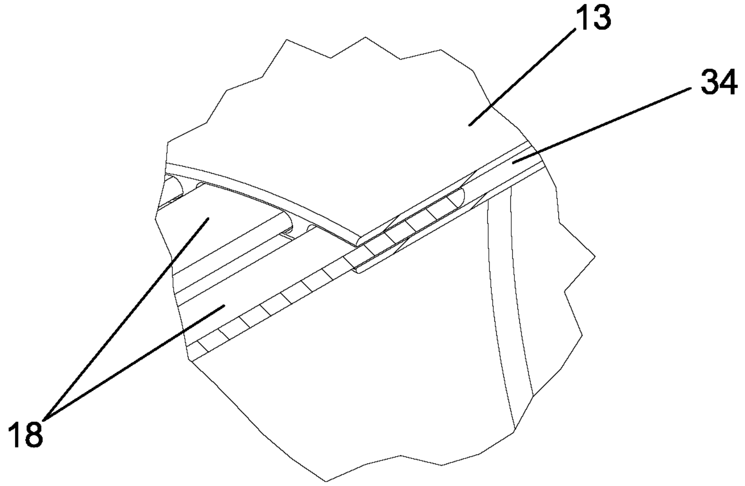

The third exemplary embodiment of the invention shown in FIGS. 9 to 12 is very similar to the already described second exemplary embodiment of the invention according to FIGS. 5 to 8. The only difference from the second exemplary embodiment is that the rods 18 of the line element 10 do not have a circular cross-section here, but are formed as flattened rods 18. FIG. 9 in turn shows a longitudinal section in this embodiment, FIG. 10 shows the region E from FIG. 9 enlarged. FIG. 11 shows a perspective view of a corresponding longitudinal section through the connecting device 1, and FIG. 12 shows the region F from FIG. 11 enlarged. FIG. 12 shows particularly well the design as flattened rods 18, which are mounted in corresponding rod receiving cavities 34 of the two connection elements 13 and 14.

FIGS. 13 to 16 show illustrations of a fourth exemplary embodiment of the invention. In this example, the line element 10 is formed as an annular spring 15. In other words, it could also be said that the line element 10 consists of an annular spring 15. Of course, it would also be possible for the line element 10 to have such an annular spring 15 only in certain regions and otherwise to have a different design.

Figure 13:
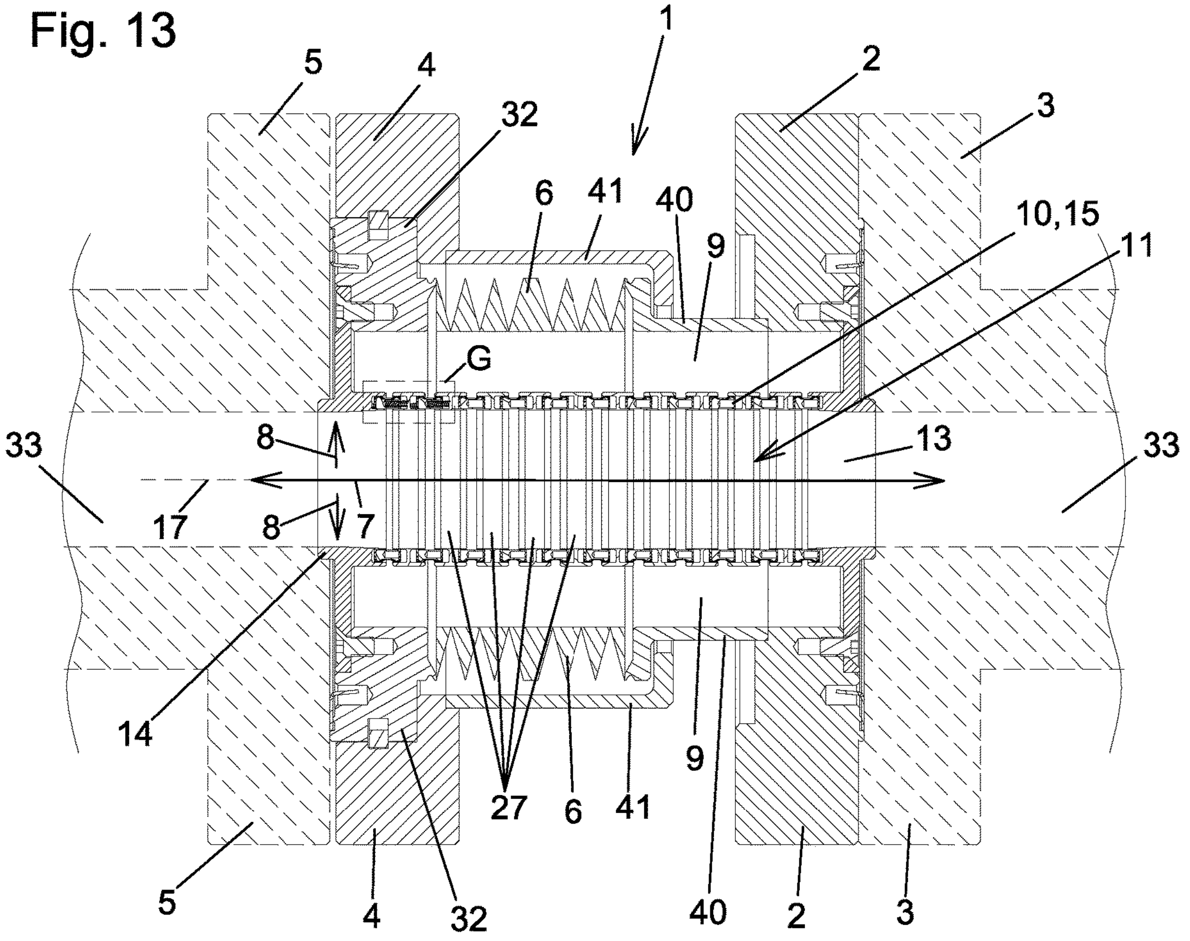
FIGS. 13 to 16 show illustrations of a fourth embodiment of a connecting device according to the invention.
Figure 14:
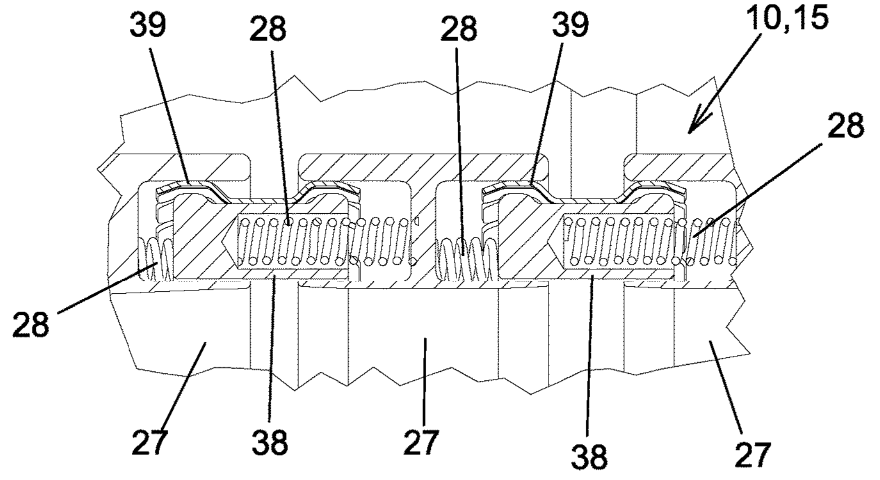
Figure 15:
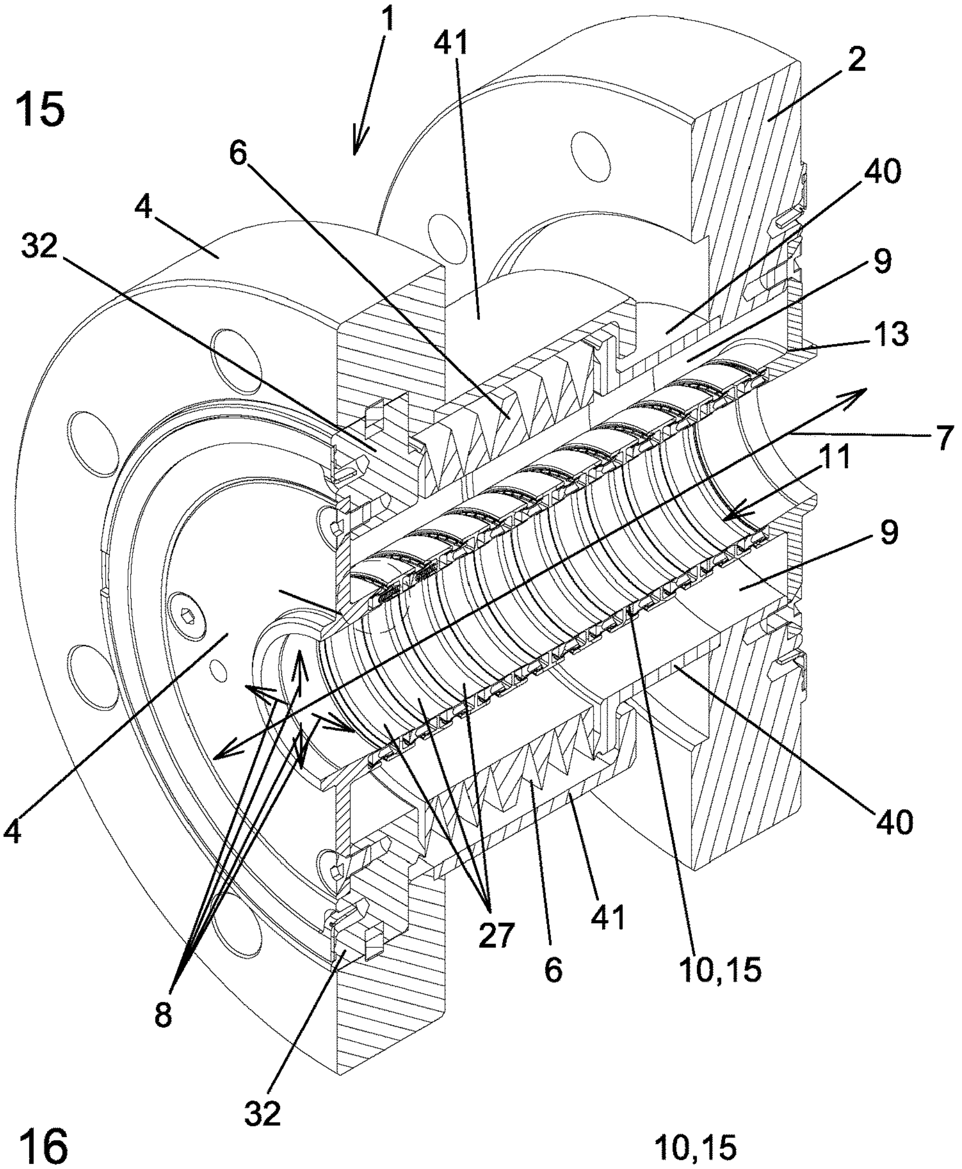
Figure 16:
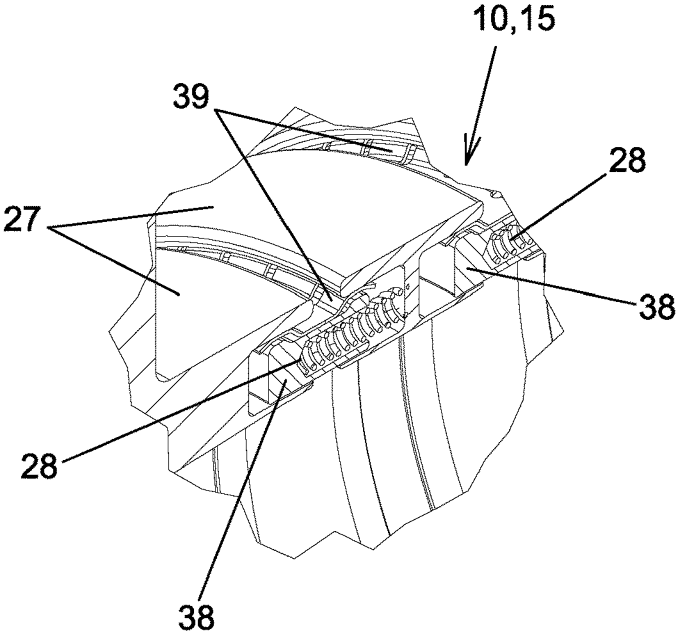

FIG. 13 shows a longitudinal section through the connecting device 1. FIG. 14 shows the region G from FIG. 13 enlarged. FIG. 15 in turn shows a longitudinal section through a corresponding perspective view of this connecting device 1. FIG. 16 shows the region H from FIG. 15 enlarged.

The annular spring 15 has a sequence of ring elements 27 arranged one behind the other. These ring elements 27 can be substantially rigid in themselves. The successive ring elements 27 are connected to each other by means of elastic elements 28 and can thus be moved relative to each other. The specific structure realized here can be seen particularly well in FIGS. 14 and 16. There it can be seen that in this exemplary embodiment the elastic elements 28 are formed as helical springs. Of course, other suitable types of springs or elastic bodies could also be used. In any case, the elastic elements 28 allow a relative movement of the ring elements 27 both in the longitudinal direction 7 and in the transverse direction 8. The elastic elements 28 also ensure a corresponding resetting when the forces acting on the flanges 2 and 4 from the outside are no longer present. In the specific exemplary embodiment shown here, intermediate ring elements 38 and additionally electrical sliding contacts 39 are located between two adjacent ring elements 27. The electrical sliding contacts 39 are of a correspondingly flexible design and ensure reliable electrical contact between the successive ring elements 27. Corresponding ends of the elastic elements 28 are mounted in the intermediate ring elements 38, as can be clearly seen in FIGS. 14 and 16. Also in this exemplary embodiment, this particular design of the line element 10 ensures that in case of relative displacements of the flanges 2 and 4 in longitudinal direction 7 or transverse direction 8, a narrowing of the cross-sectional area of the line cavity 11 does not occur. Thus, this type of line element 10 according to the invention also ensures that a relative displacement between the two flanges 2 and 4 does not negatively influence the charged particles or beams of such charged particles passed through the line cavity 11.

Figure 17:
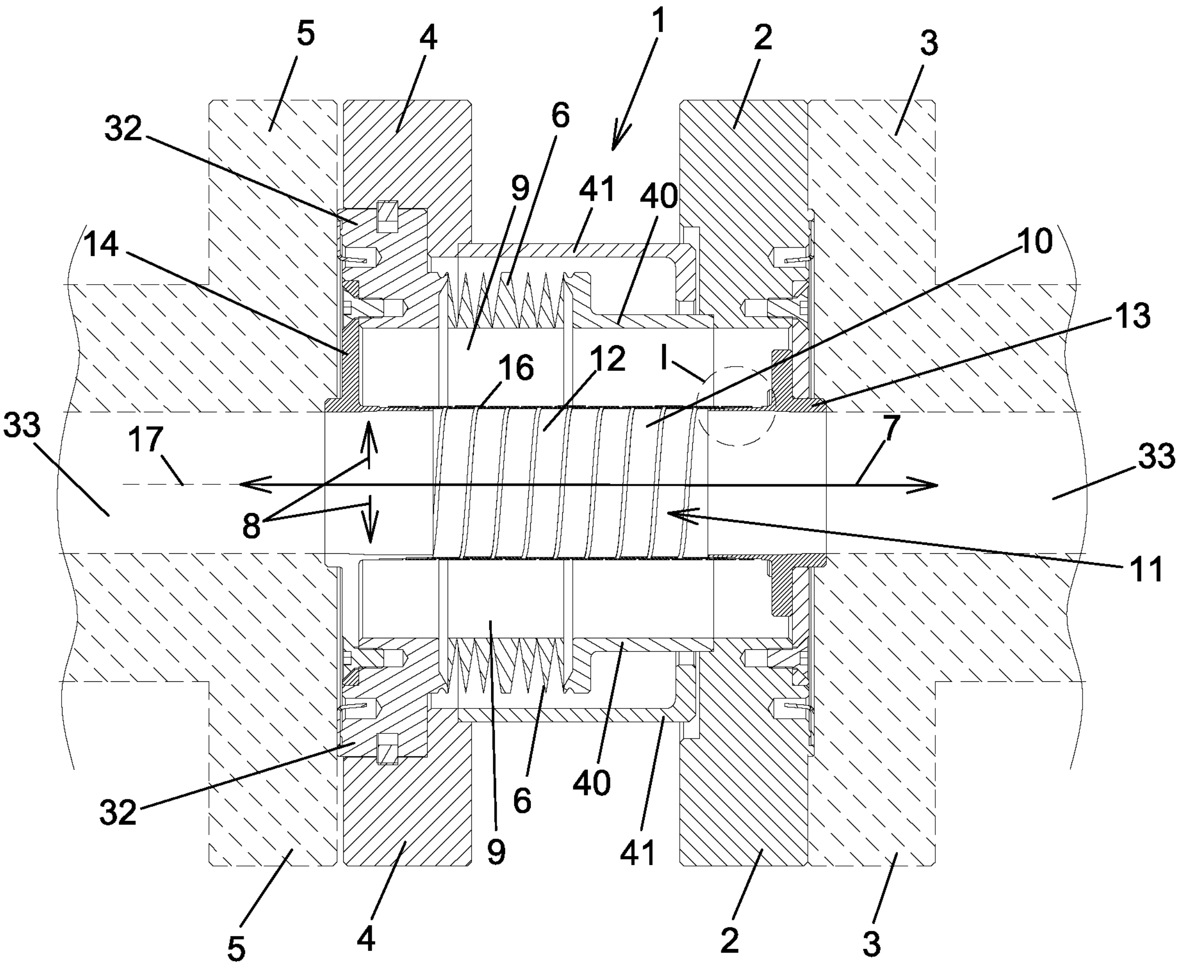
FIGS. 17 to 20 show illustrations of a fifth embodiment of a connecting device according to the invention.
Figure 18:
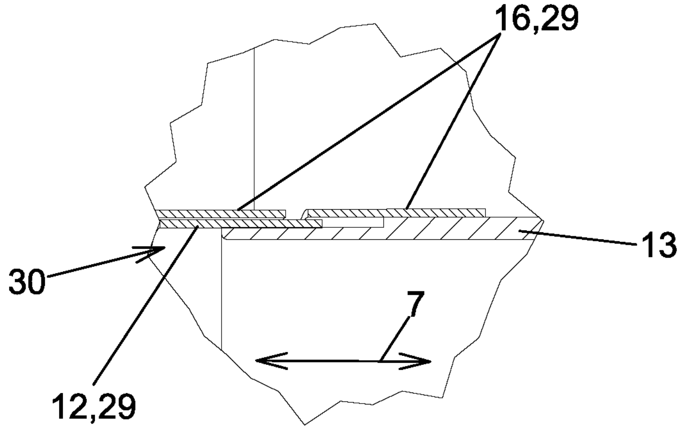
Figure 19:
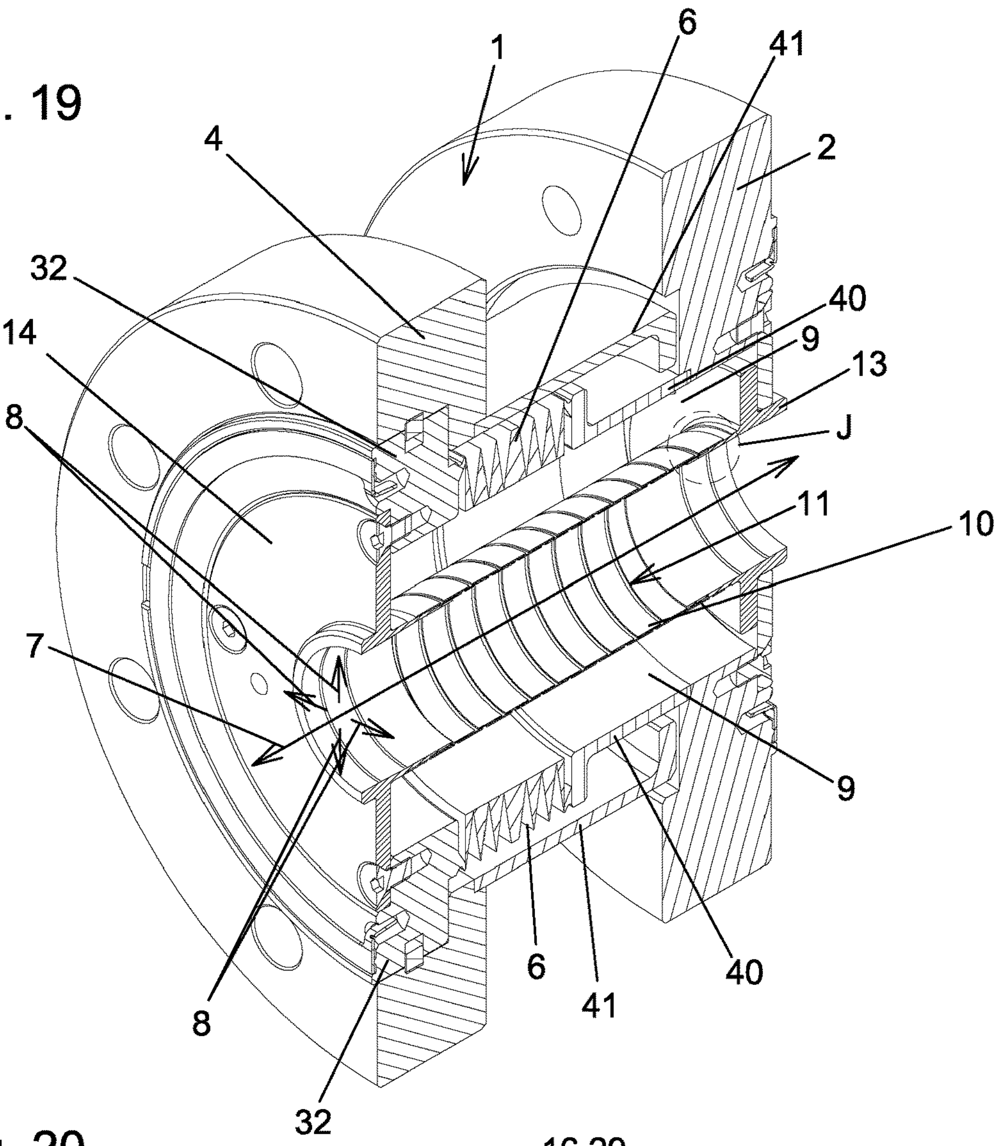
Figure 20:
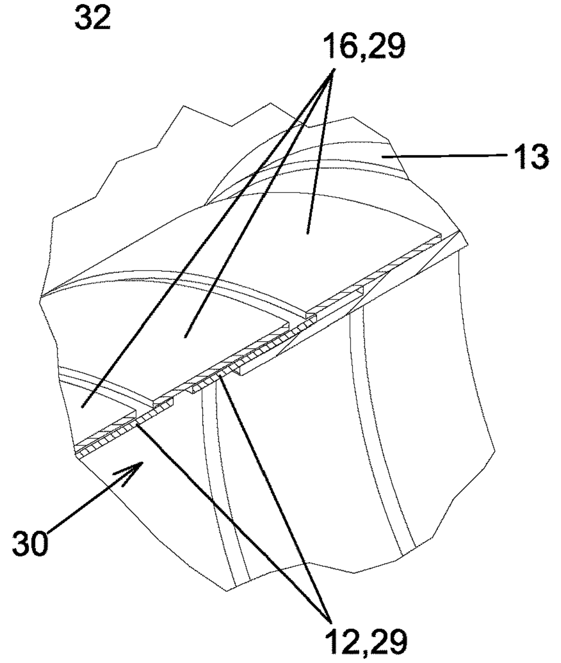

The fifth exemplary embodiment of the invention shown in FIGS. 17 to 20 is a variant in which the line element 10 is formed from at least one helical spring 16. FIG. 17 in turn shows a longitudinal section through the connecting device 1. In FIG. 18, the region I is shown enlarged. FIG. 19 shows a perspective view in longitudinal section and FIG. 20 shows the region J from FIG. 19. Even though in principle a single helical spring 16 would be sufficient to electrically conductively connect the two connection elements 13 and 14 to each other and to surround the line cavity 11, in this exemplary embodiment it is nevertheless provided that the line element 10 has two helical springs 12 and 16, one of the helical springs 12 being arranged in an interior space 30 of the other helical spring 16. The turns 29 of the two helical springs 12 and 16 are arranged offset from one another in the longitudinal direction 7 of the connecting device 1, as can also be seen clearly in FIGS. 18 and 20. The turns 29 of both helical springs 12 and 16 each lie on an imaginary circular-cylinder lateral surface. The helical springs 12 and 16 or their turns 29 allow a corresponding elastic deformation of the line element 10 in the event of a corresponding relative displacement between the flanges 2 and 4, without the opening cross-section of the line cavity 11 changing significantly. This also ensures that the charged particles or beams of charged particles passing through the line cavity 11 are not negatively affected. The turns 29 can be moved elastically relative to each other, so that a corresponding resetting is also ensured when the displacement between the flanges 2 and 4 is cancelled.

Figure 21:
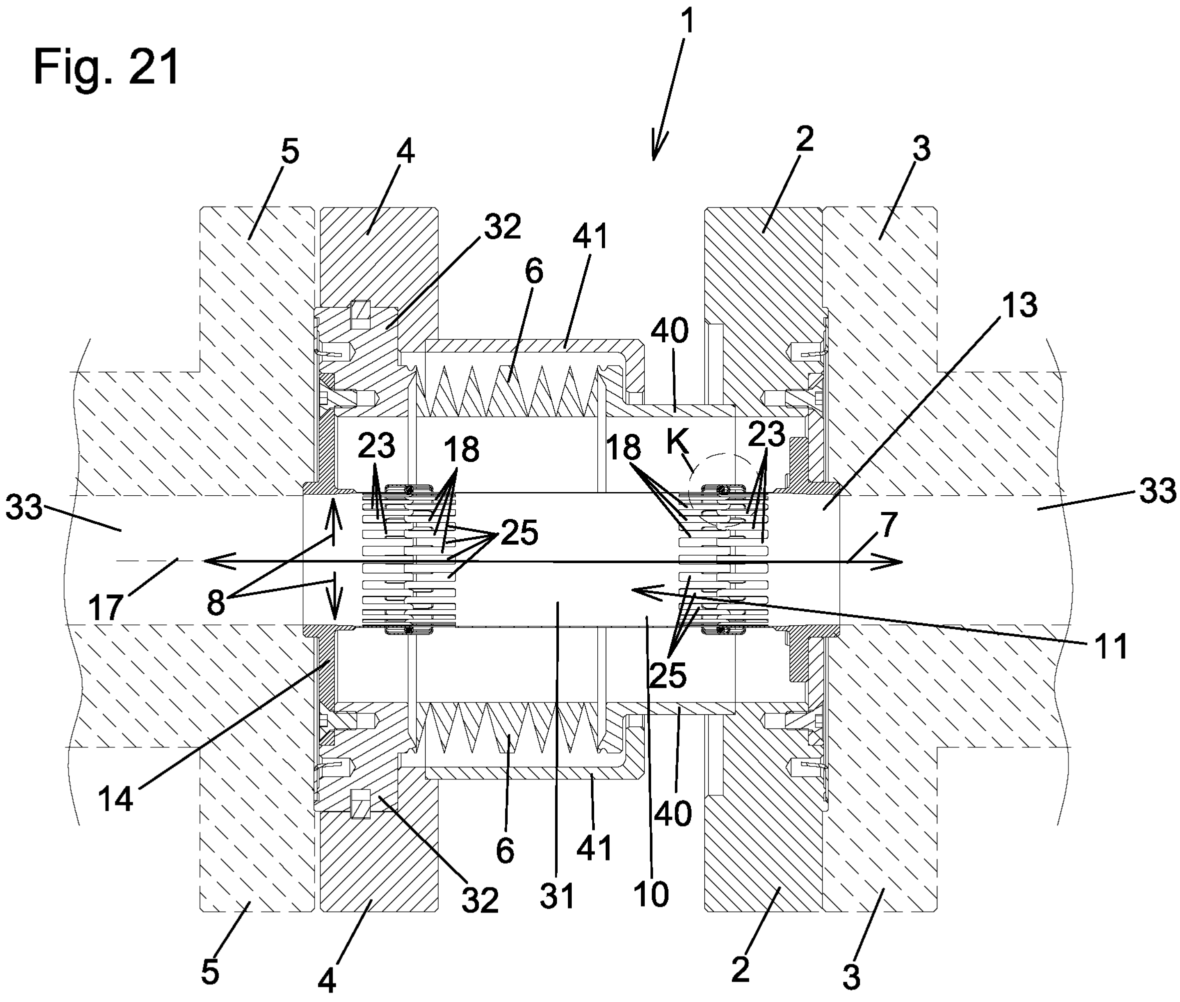
FIGS. 21 to 24 show illustrations of a sixth embodiment of a connecting device according to the invention.
Figure 22:
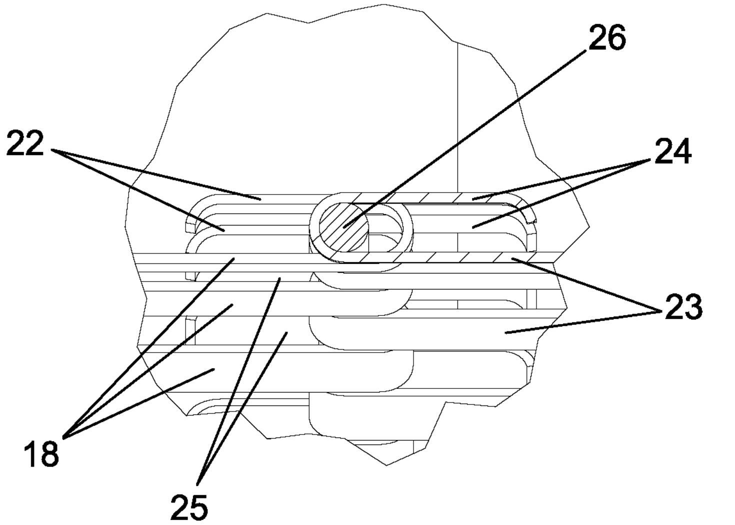
Figure 23:
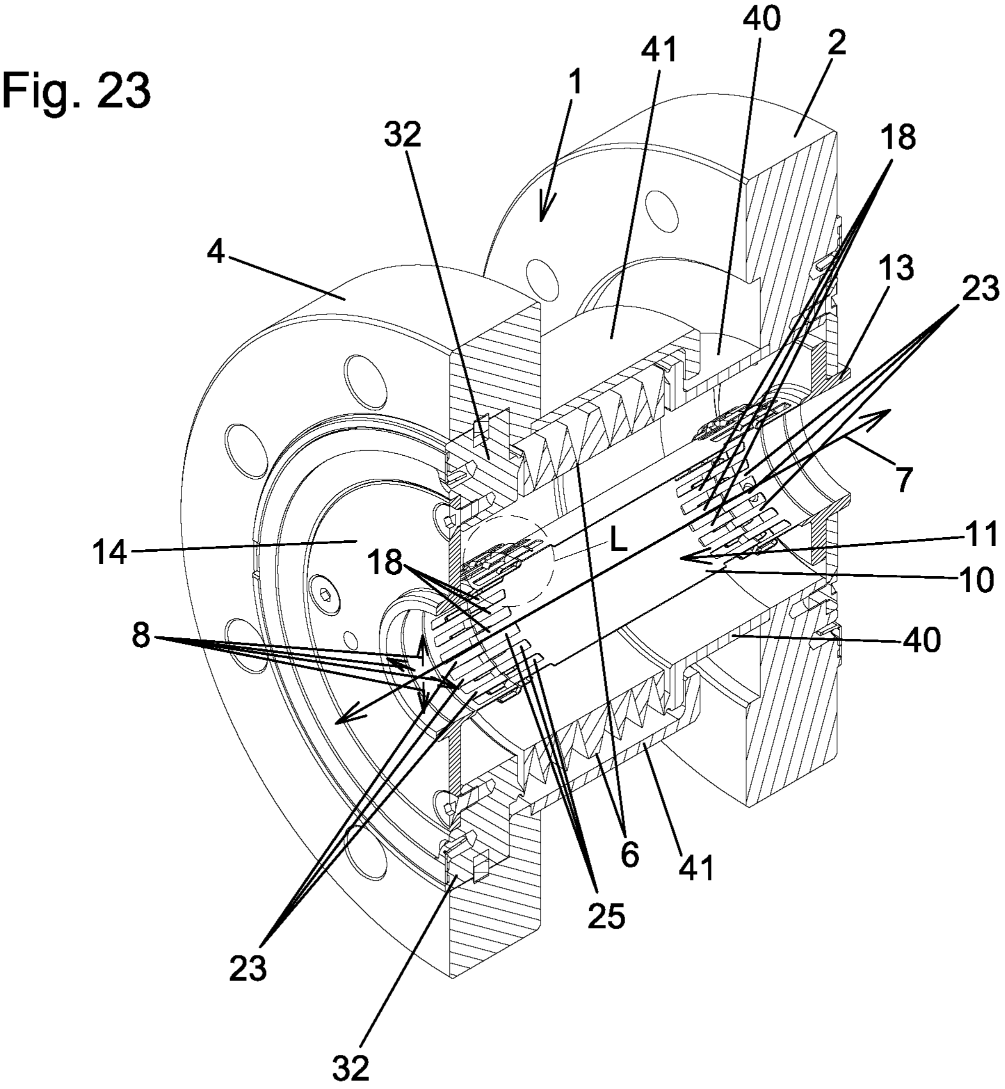
Figure 24:
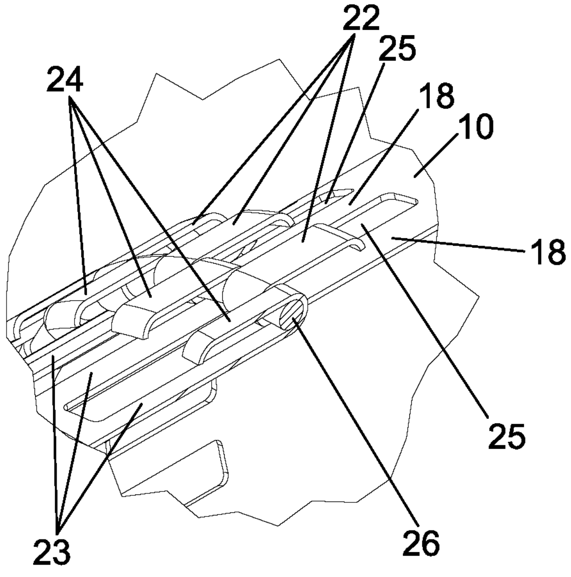

The sixth exemplary embodiment in FIGS. 21 to 24 now shows a variant of a line element 10 in which the ends of the rods 18 of the line element 10 pointing towards the corresponding connection element 13 or 14 each have a bend 22. FIG. 21 in turn shows a longitudinal section, and FIG. 22 shows the region K from FIG. 21 enlarged. FIG. 23 shows a perspective longitudinal section. FIG. 24 shows the region L from FIG. 23 enlarged.

In this exemplary embodiment, the connecting region 31 of the rods 18 is relatively wide in the central region of the line element 10. Of course, this does not necessarily have to be the case. It could of course also be narrower, as is the case, for example, in the first exemplary embodiment in FIGS. 1 to 4.

In this exemplary embodiment, the various connection elements 13 and 14 also have rods 23. These rods 23 also have a bend 24. The bends 24 of the rods 23 of the particular connection element 13 or 14 are arranged in intermediate spaces 25 between the bends 20 of the rods 18 of the line element 10. A connecting rod 26 is passed through the bends 24 of the rods 23 of the particular connection element 13 and 14 and through the bends 22 of the rods 18 of the line element 10, as can be clearly seen in FIGS. 22 and 24. Both the bends 22 of the rods 18 and the bends 24 of the rods 23 are each formed as a slot, so that the various connecting rods 26 are mounted so as to be displaceable in the longitudinal direction 7 in the bends 22 and 24. This also allows compensation for relative movements of the two flanges 2 and 4 both in the longitudinal direction 7 and in the transverse direction 8, without this leading to relevant changes in the opening cross-section of the line cavity 11. Also as a result of this, the course of the charged particles or beams of such particles passed through the line cavity 11 remains substantially unaffected when the flanges 2 and 4 are moved relative to each other, for example due to thermal factors, with the line system.

KEY TO THE REFERENCE SIGNS

1 connecting device
2 first flange
3 first line
4 second flange
5 second line
6 bellows
7 longitudinal direction
8 transverse direction
9 interior space
10 line element
11 line cavity
12 helical spring
13 connection element
14 connection element
15 annular spring
16 helical spring
17 axis of rotation
18 rod
19 bulge
20 bulge
21 support shoulder
22 bend
23 rod
24 bend
25 intermediate space
26 connecting rod
27 ring element
28 elastic element
29 turn
30 interior space
31 connecting region
32 pivot bearing ring
33 line interior space
34 rod receptacle
38 intermediate ring element
39 electrical sliding contact
40 jacket tube
41 jacket tube

The invention claimed is:

1. A connecting device for a line system for passing through charged particles, the connecting device comprising:

a first flange for connection to a first line or chamber of the line system;

a second flange for connection to a second line or chamber of the line system;

a bellows, by which the first flange and the second flange are connected to each other;

the first flange and the second flange are movable relative to one another to compensate for displacements between the first line or chamber of the line system and the second line or chamber of the line system in a longitudinal direction of the connecting device and in at least one transverse direction of the connecting device angled relative to the longitudinal direction;

a line element arranged in an interior space surrounded at least in some regions by the bellows, the line element connects the flanges electrically conductively to one another and surrounds a line cavity for passing through the charged particles; and a respective connection element is arranged on each of the first flange and the second flange for electrically connecting the line element to the respective flange, and the line element is at least one of a) movably mounted in or on both connection elements, or b) comprised of at least one annular spring or at least one helical spring;

wherein at least one of the connection elements is rotatably mounted on the respective flange.

2. The connecting device according to claim 1, wherein the at least one of the connection elements that is rotatably mounted on the respective flange is mounted for rotation about an axis of rotation coaxial or at least parallel to the longitudinal direction of the connecting device.

3. The connecting device according to claim 1, wherein the line element comprises a plurality of rods, and the rods are arranged extending parallel to each other and spaced apart from each other and jointly surrounding at least a partial region of the line cavity or an entirety of the line cavity.

4. The connecting device according to claim 3, wherein the rods are mounted movably and electrically conductively in or on both said connection elements.

5. The connecting device according to claim 4, wherein the rods are mounted in rod-receiving cavities of the two connection elements.

6. The connecting device according to claim 1, wherein an annular spring, which is part of the line element or forms the line element, includes a sequence of ring elements arranged one behind the other, with the successive ring elements being connected to one another by elastic elements and being movable relative to one another.

7. The connecting device according to claim 1, wherein the line element is comprised of the at least one helical spring, which includes a plurality of turns arranged one behind the other, which are elastically movable relative to each other.

8. The connecting device according to claim 7, wherein the turns are arranged on an imaginary circular-cylinder lateral surface.

9. The connecting device according to claim 7, wherein the line element comprises two of the helical springs, one of the helical springs being arranged in an interior space of the other helical spring.

10. The connecting device according to claim 9, wherein turns of the two helical springs are arranged offset with respect to one another in the longitudinal direction.

11. A connecting device for a line system for passing through charged particles, the connecting device comprising:

a first flange for connection to a first line or chamber of the line system;

a second flange for connection to a second line or chamber of the line system;

a bellows, by which the first flange and the second flange are connected to each other;

the first flange and the second flange are movable relative to one another to compensate for displacements between the first line or chamber of the line system and the second line or chamber of the line system in a longitudinal direction of the connecting device and in at least one transverse direction of the connecting device angled relative to the longitudinal direction;

a line element arranged in an interior space surrounded at least in some regions by the bellows, the line element connects the flanges electrically conductively to one another and surrounds a line cavity for passing through the charged particles; and a respective connection element is arranged on each of the first flange and the second flange for electrically connecting the line element to the respective flange, and the line element is at least one of a) movably mounted in or on both connection elements, or b) comprised of at least one annular spring or at least one helical spring;

wherein the line element comprises a plurality of rods, and the rods are arranged extending parallel to each other and spaced apart from each other and jointly surrounding at least a partial region of the line cavity or an entirety of the line cavity; and wherein rods of the respective connection element include two bulges, spaced apart from one another in the longitudinal direction, formed thereon, for electrically conductive connection to one said respective rod each of the line element, the rods with the bulges rest in an electrically conductive manner on the respective rod of the line element and the respective rod of the line element is supported by a support shoulder that contacts the respective rod of the line element in a region between the two bulges of the respective rod of the respective connection element on a side opposite to the respective rod of the respective connection element.

12. A connecting device for a line system for passing through charged particles, the connecting device comprising:

a first flange for connection to a first line or chamber of the line system;

a second flange for connection to a second line or chamber of the line system;

a bellows, by which the first flange and the second flange are connected to each other;

the first flange and the second flange are movable relative to one another to compensate for displacements between the first line or chamber of the line system and the second line or chamber of the line system in a longitudinal direction of the connecting device and in at least one transverse direction of the connecting device angled relative to the longitudinal direction;

a line element arranged in an interior space surrounded at least in some regions by the bellows, the line element connects the flanges electrically conductively to one another and surrounds a line cavity for passing through the charged particles; and a respective connection element is arranged on each of the first flange and the second flange for electrically connecting the line element to the respective flange, and the line element is at least one of a) movably mounted in or on both connection elements, or b) comprised of at least one annular spring or at least one helical spring;

wherein the line element comprises a plurality of rods, and the rods are arranged extending parallel to each other and spaced apart from each other and jointly surrounding at least a partial region of the line cavity or an entirety of the line cavity;

wherein ends of the rods of the line element facing the respective connection element each have a bend and the respective connection element includes rods with bends thereon, the bends of the rods of the respective connection element are arranged in intermediate spaces between the bends of the rods of the line element and a connecting rod is passed through the bends of the rods of the respective connection element and through the bends of the rods of the line element.

* * * * *